Nov. 3, 1959  G. M. BELLAIRS  2,911,255
STEEL CAST DISK VEHICLE WHEEL
Filed March 12, 1957  2 Sheets-Sheet 1

George M. Bellairs
INVENTOR.

BY Clarence A. O'Brien
and Harvey B. Jackson
Attorneys

Nov. 3, 1959  G. M. BELLAIRS  2,911,255
STEEL CAST DISK VEHICLE WHEEL
Filed March 12, 1957  2 Sheets-Sheet 2
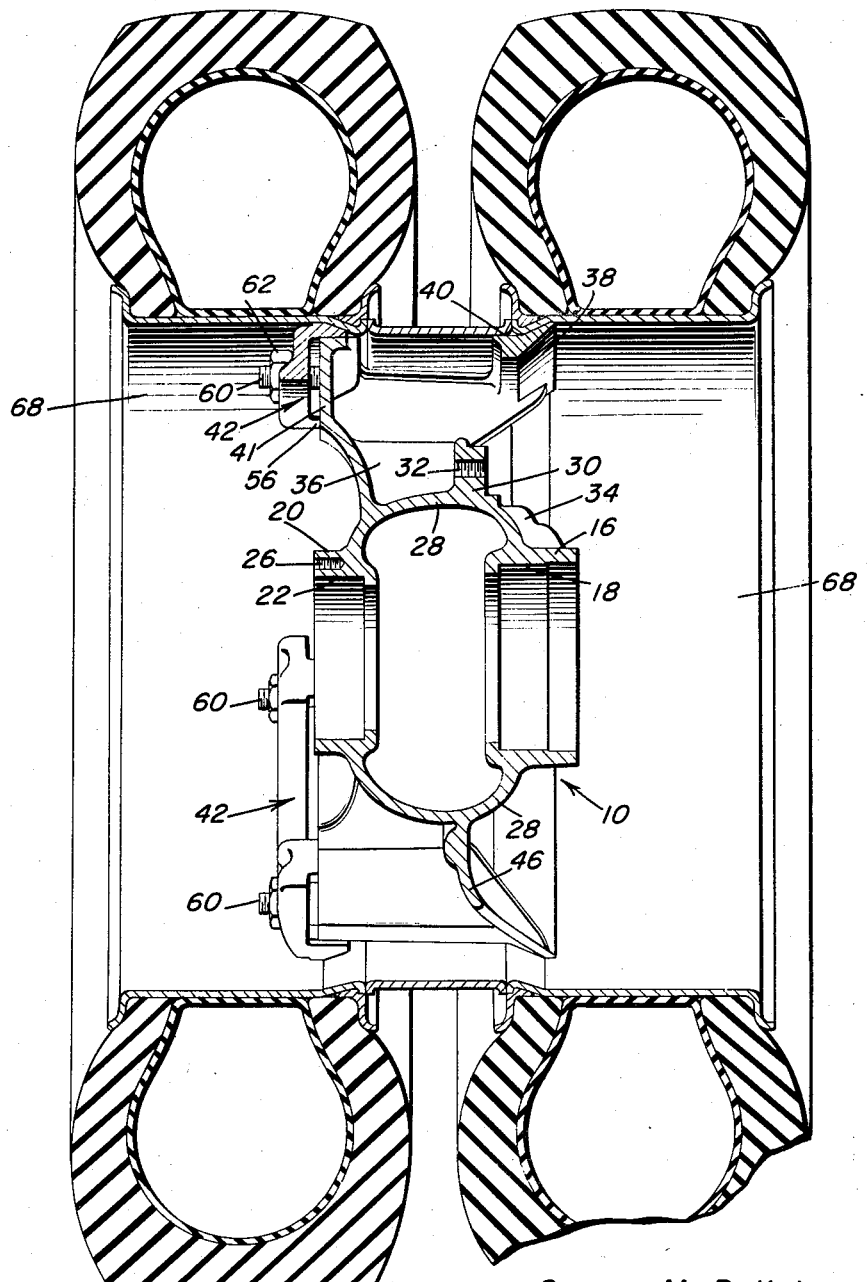
Fig. 3
Fig. 5
George M. Bellairs
INVENTOR.
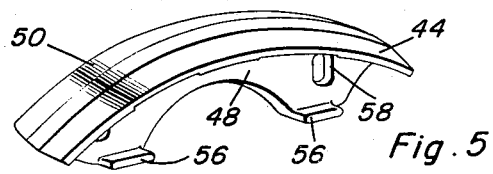

United States Patent Office 2,911,255
Patented Nov. 3, 1959

2,911,255

STEEL CAST DISK VEHICLE WHEEL

George M. Bellairs, Webb City, Mo., assignor to American Steel and Pump Corporation, New York, N.Y., a corporation of Delaware Application March 12, 1957, Serial No. 645,546

5 Claims. (Cl. 301—12)

This invention relates in general to new and useful improvements in wheel constructions, and more specifically to an improved wheel for automotive trucks and trailers which is of the steel cast disk-type.

At the present time there is in use in the automotive trailer industry wheels of two different types. One type is a cast spoke type and the other is the press steel disc type. In the case of the cast spoke wheel, the advantages are mainly that this type of wheel offers a much longer service life primarily due to the rigid construction of the spokes and the fact that the hubs and spokes are cast together as one integral unit, thus bringing about a well stabilized connection at the point of maximum stress concentration. Therefore, this type of wheel is a stronger unit and a lighter wall assembly weight than the pressed steel disc type. Further advantages of the cast spoke type wheel is the ease of disassembly and re-assembly of a tire and rim assembly to the wheel when this is necessary inasmuch as the tire and rim assembly is clamped to the wheel by individual rim clamps carried by the spokes, thus facilitating the removal of the tire and rim assembly through the simple operation of removing these clamping lugs.

The disadvantages of the cast spoke type wheel are mainly due to the difficult operation of obtaining and maintaining a properly aligned assembly. To properly align the tire tread, the entire assembly must be aligned so that the tire tread will maintain a straight path during the operation of the wheels, otherwise the tread is running in a path at an angle to the path of the vehicle thus causing rapid tire wear. Inasmuch as this alignment depends upon the mating of the tapered annular surfaces of the interior of the tire rim with the tapered surfaces of either the spikes or the clamping lugs, and since the surfaces afforded by the present wheels are relatively small, oftentimes the tires become canted. Further, it is difficult to maintain proper alignment of the assembly since the small surfaces of the present wheels allow the partial collapsing of the roll sections of the rims and a general relaxing of the original shapes thereof to cause one mating part to conform to the other. This change in shapes and contours under the small bearing surfaces causes a loose assembly to develop, resulting in misaligned tire tread relationship with the wheel rotation. This subsequently will cause movement of greater magnitude resulting in slippage between the rim and wheel and eventually loss of the tire and rim assembly from the vehicle.

The advantages of the disc type wheel closely covers the disadvantages of the cast spoke type wheel and its disadvantages coincide very closely to the advantages of the cast spoke wheel. This type of wheel affords extra tire tread alignment since the tire mounting surface and the disk of the wheel are one integral part and the alignment is dependent upon the mounting surface of the disc relative to the machined mounting surface of the hub. The disc type wheel is a relatively safe assembly since the flange of the clamping nuts is of a tapered configuration which matches the internal taper of the holes which surround the mounting stud. Thus a very good locating and clamping relationship is obtained and subsequent movement of this clamped assembly is practically eliminated. The disadvantages of a disc type wheel are its greater over-all assembly weight brought about by the necessity of two pressed steel discs, one for each tire, and shorter service life, due to the lack of rigidity afforded in the present steel disc. It will be readily seen that in general the disc type wheel will afford many features desired by truck operators although in view of the foregoing disadvantages, the cast spoke wheel is by far more popular with truck operators.

In view of the foregoing, it is the primary object of this invention to provide a wheel for automotive trailers and trucks which will have all of the advantages of both the disc type wheel and the cast spoke type wheel and at the same time will eliminate the disadvantages of the two wheels.

Another object of this invention is to provide a cast spoke type wheel which is so constructed whereby it will receive rims of existing cast spoke type wheels and at the same time may utilize the brake drums of existing disc type wheels so as to eliminate the necessity of truck operators to buy additional parts when changing from their present type of wheels to the wheel of this invention.

Still another object of this invention is to provide an improved vehicle wheel for automotive vehicles such as trailers and trucks, the vehicle wheel being of a cast construction and at the same time having all the advantages of a disk-type wheel, the wheel providing three points of suspension for a vehicle rim, the three points of suspension each being relatively large in a circumferential direction and each of the three points of suspension including a relative wide lug held in place by a minimum of two lug bolts to prevent undue stresses from being placed upon individual lug bolts.

A further object of this invention is to provide an improved cast vehicle wheel of the disk-type for mounting rims of trailers and trucks, the wheel including three spoke portions which provide support for relatively large circumferentially extending wedge-shaped rim engaging gripping clamps with the same curvature as the internal curvature of the rims whereby centering and alignment of the rims on the wheel is automatic and secure gripping against rim slippage is effected upon the tightening of lugs against each spoke which is substantially coextensive with the gripping clamps for retaining the rims on the wheels.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a vertical sectional view taken through the vehicle wheel of Figure 1 and shows mounted thereon rim and tire assemblies;

Figure 5 is a rear perspective view of the lug of Figure 4 and shows the details thereof.

Figure 1:
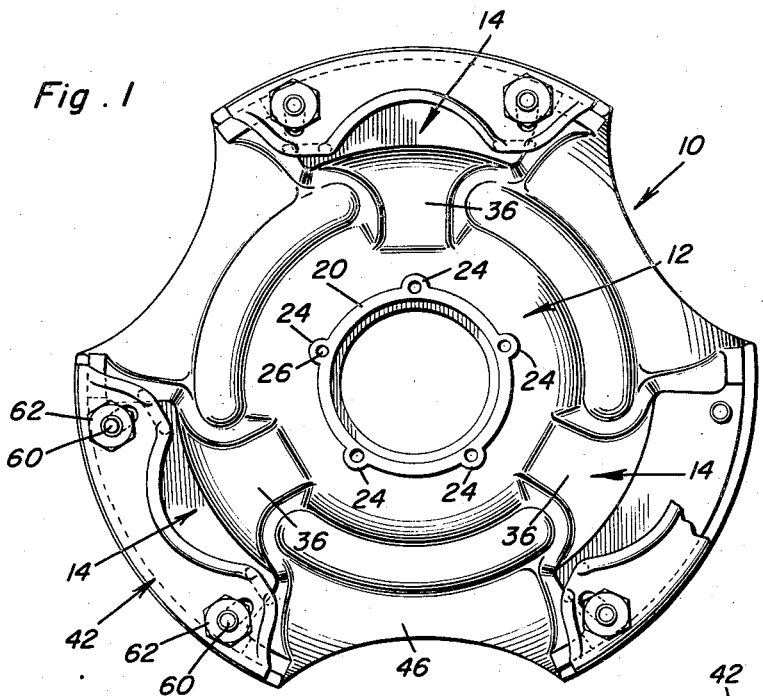
Figure 1 is an elevational view showing the exterior configuration of the outer side of the vehicle wheel, a portion of one of the lugs being broken away for purposes of clarity.

Referring now to the drawings in detail, there is illustrated the vehicle wheel which is the subject of this invention, the vehicle wheel being referred to in general by the reference numeral 10. The vehicle wheel 10 includes an enlarged central hub portion 12 and a plurality of radiating and symmetrically disposed spoke portions 14, in this instance three, which at their outer periphery have the same curvature as the internal curvature of the rims and collectively extend for at least one-half of the outer wheel circumference to properly align, clamp and effectively retain the tire rims thereon against canting and slipping. The hub portion and the spoke portions 14 are cast as an integral unit and simulate a disk wheel of the pressed type, but which possess advantages of both the pressed disk and cast-steel types of wheels.

The enlarged hub portion 12, as is best shown in Figure 3, includes an annular inner part 16 having an interior bearing surface 18 for the reception of an inner bearing. Aligned with the annular inner part 16 is an annular outer part 20 for the reception of an outer bearing. The annular outer part 20 is provided with an internal bearing surface 22. The vehicle wheel 10 is, therefore, of rigid pre-cast unitary construction providing spaced inner and outer aligned axial bearing surfaces 18 and 22 connected by an integral central hub such as the belled central part 28. The three symmetrically disposed spoke portions 14 extend radially therefrom and are integrally cast with the belled central part 28 interposed between the aligned bearing surfaces 18 and 22 to comprise a homogeneous self-contained wheel assembly. As shown, the spoke portions 14 extend radially from the belled central part 28 to terminate in laterally offset and inwardly projecting flanges defining peripheral circumferential walls corresponding in curvature with the tire retaining rim to solidly support the clamping lugs 42 therebetween as will more fully appear hereinafter. The annular outer part 20 includes enlargements 24, best shown in Figure 1, and which are provided with internally threaded bores 26. The bores 26 receive bolts (not shown) for retaining a removable cover (not shown) in place.

The annular parts 16 and 20 are connected together by an outwardly belled central part 28 of the hub portion 12, as is best shown in Figure 3. The inner face of the belled central part 28 is provided with a plurality of radiating projections 30 best shown in Figure 2. The projections 30 provide for the mounting of relatively large brake drums (not shown) and include internally threaded bores 32 for the purpose of receiving bolts (not shown) which are used to secure a brake drum in place. It is to be noted that the belled part 28 is reinforced in the vicinity of each of the projections 30 by a radiating rib 34.

Each of the spoke portions 14 is integrally connected to the belled central part 28 and includes a relatively large reinforcing rib 36. The rib 36 is hollow, as is shown in Figure 3, in order to provide a maximum strength to weight ratio. Each of the spoke portions 14 includes an inner segmental annular part 38 for engagement with a rim, the outer surface of the part 38 being provided with a contour corresponding to the contour of the rim to be engaged, this outer surface being referred to by the reference numeral 40. Disposed in transverse spaced relation, from the part 38 is an outer part 41. The outer part 41 is not intended to engage a rim, but carries a removable clamping lug 42 substantially coextensive with and corresponding to the circumferential outer peripheral edge region of each spoke 14 and having laterally projecting wedge-shaped gripping edges 44 with the same curvature as the internal curvature of the tire rims for full contacting support and gripping therebetween. The rim gripping clamping lug 42 is provided with a segmental annular wheel engaging surface which has an arcuately curved and wedge-shaped gripping edge 44 corresponding generally to the oppositely wedge-shaped rim gripping surface 40 and which is disposed in opposed relation to the surface 40 whereby a rim, or rims as the case may be, may be suitably clamped by the plural clamping lugs 42 for substantially one-half or more of the circumferential extent thereof between the confronting rim gripping and wedging surfaces 40 and 44.

It is noted that the spoke portions 14 are three in number and extend at their outer periphery for at least one-half of the total wheel rim circumference for assured alignment and effective clamping without slippage or rim, lug or stud failures. By providing only three spoke portions 14, there is provided a three point suspension for the vehicle rim. It is also to be noted that the spoke portions 14 extend circumferentially a distance which is greater than the spacing therebetween, thereby providing a circumferential spoke and corresponding clamping lug bearing and wedge-gripping engagement which is effective for at least one-half or more of the rim circumference to which they are applied along three equi-distant arcs thereof. Thus, the maximum contact surface support is provided for each clamping lug 42 which wedges and grips the rim between opposing and confronting wedge shaped gripping members 40—44, while the entire clamping lug 42 is supported and held tight and fast against the solid outer surface region of the spokes 14 circumferentially co-extensive therewith as will appear more fully hereinafter. In order to more fully reinforce the spoke portions 14 and prevent the accidental breaking or failure thereof, the hub portion 12 is provided with an annular segmental reinforcing rib or flange 46 best shown in Figures 1 and 2, whereby the clamping lugs 42 are rigidly supported throughout their arcuate extent and the rim held fast by a pair of spoke anchored studs 60 engaged by fastener nuts 62 for each of the three clamping lugs 42 disposed therebetween with their arcuate wedge-shaped gripping edges 44 in effective contact.

Figure 4:
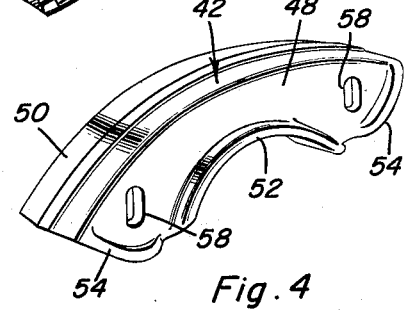
Figure 4 is a perspective view of one of the lugs removed from the wheel.

Referring now to Figures 4 and 5 in particular, it will be seen that each of the clamping and aligning lugs 42 is relatively wide and includes a web portion 48 which terminates in an annular flange 50, the flange 50 having a portion thereof formed to provide the wedge-shaped rim engaging arcuate surface 44 previously described. The radial interior part of the web 48 is reinforced by an outwardly projecting flange 52 and the ends of the web 48 are reinforced by flanges 54, best shown in Figure 4. The inner surface of the web 48 is provided with inwardly projecting parts 56 which are engageable with the part 41 to assure proper positioning of the rim clamping and aligning lugs 42.

Figure 2:
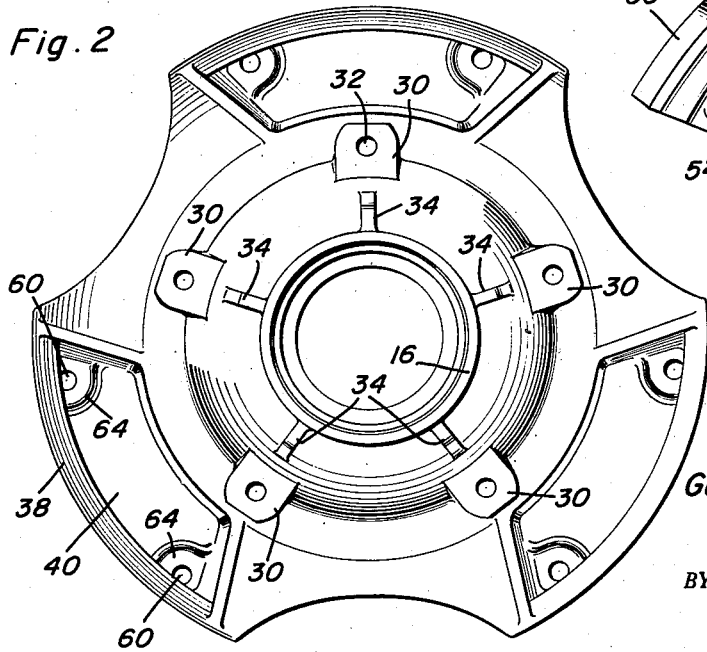
Figure 2 is an elevational view of the vehicle wheel of Figure 1 showing the details of the inner side or face thereof.

It is to be noted that each of the rim clamping and aligning lugs 42 is provided with a pair of holes 58. The holes 58 are elongated in a direction parallel to a central radius and are intended for the reception of lug bolts. Each of the spoke portions 14 carries a pair of widely spaced lug bolts 60 anchored therein. The lug bolts 60 are provided with removable nuts 62 to retain the rim clamping and aligning lugs 42 thereon. The lug bolts 60 pass through the holes 58 and the rim clamping and aligning lugs 42 may be readily positioned due to the elongation of the holes 58 and tightened so that the entire circumferential expanse of the arcuate clamping lugs 42 are solidly supported by and against the laterally offset and inwardly projecting flanges defining the outer peripheral surface region of each spoke 14 which is co-extensive therewith and the clamping lugs 42. As is shown in Figure 2 the inner portion of the part 41 is enlarged as at 64 to provide proper support for each of the lug bolts 60.

In the use of spoke wheels, individual tires are mounted on the rims 68 and retained thereon by suitable split rings of standard construction. The individual rim 68 is removable from a wheel, such as the wheel 10, and is held in place by the clamping and aligning lugs 42. Ordinarily, the inside clamping lugs 40 which correspond to the exterior clamping lugs 42 of standard construction (not shown) are relatively narrow and are held in place by a single bolt. Not only do the lugs of the ordinary spoke wheel fail to provide effective gripping and suitable aligning surfaces for the prevention of rim canting and slipping, but also the individual spokes do not have sufficient extent to provide proper support for wide clamping lugs to prevent their yielding or failure while in gripping engagement; therefore, the provision of extraordinarily wide bearing spokes 14, in this instance three which collectively extend for at least one-half of the outer wheel circumference with correspondingly wide and substantially coextensive and fully contacting wedge-shaped gripping and clamping lugs 42 having the same curvature as the internal curvature of the tire rims, will effectively align, edge-grip, and retain truck and trailer rims against slippage, rupture and failure. To this end, the rim engaging surfaces 40 of the spoke portions 14 and the rim engaging surfaces of the lugs 42 extend considerably in a circumferential direction for at least one-half of the total inner rim circumference as illustrated in Figure 1 of the preferred embodiment, and thus provide for the proper alignment and effective gripping of the rims 68. It is merely necessary to place the desired rim 68 on the proper wheel 10 and to position the wide clamping lugs 42. The tapered contour of the rim engaging surfaces 44 on each clamping lug 42 will automatically align the lugs 42 as the nuts 62 are tightened. The clamping lugs 42 corresponding to and extending for at least one-half of the total rim circumference, will be sufficient to properly clamp the individual rim 68 in place on the wheel 10 to preclude rim canting, rim slipping and rim failure.

It is to be noted that the lugs 42 extend a relatively great length in the circumferential direction. In fact, in the preferred embodiment the combined length of the arcuate clamping lugs 42 in a circumferential direction is greater than the combined length of the spacings therebetween; however, the minimum circumferential effective gripping expanse thereof could be substantially one-half of the rim circumference to avoid failures with present wheel sizes, truck and trailer sizes and capacities, and present rim steel specifications. This provides adequate support for the individual rim 68 and reduces any concentration of pressure upon the individual lugs 42 in the operation of the vehicle wheel 10. Further, inasmuch as the individual lugs 42 are retained in place by a plurality of lug bolts 60 and nuts 62, breakage of an individual lug bolt 60 will be prevented. Therefore, the wheel 10 provides a greater degree of protection against any accidental breakage of lug bolts.

From the foregoing, it will be readily apparent that there has been devised a novel vehicle wheel which is generally of a disk-type and which is used for the replacement of spoke type wheels. The wheel 10 permits the use of existing rims, such as the rims 68 and at the same time provides for a maximum of strength. Further, the wheel 10 permits the mounting of the necessary size of brake drum and assures the proper alignment of the individual rim 68 and tire 66.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A heavy duty integrally cast rigid vehicle wheel for trailers and the like, comprising a central hub portion, spaced internal bearing receiving surfaces axially aligned in said hub portion, brake drum securing means on the inside face of said hub portion, three spoke portions extending radially from and integrally cast with said hub portion to provide a rigid unitary and homogeneous cast wheel, each of said spoke portions having laterally offset inwardly projecting circumferential flanges conforming in curvature with the tire rim adapted for support and confinement thereon, said inwardly projecting spoke flanges being co-extensive with and an integral homogeneous part of said spoke portions at their outer periphery to constitute a three-bearing self-aligning rim supporting self-contained homogeneous precast wheel, relatively wide rim clamping lugs having circumferentially conforming wedge-shaped gripping edges co-extensive with said spoke flanges in full peripheral support thereon, the combined circumferential extent of the outer peripheral spoke projecting flanges and complemental clamping lugs being at least one-half of the engageable rim circumference along three equi-distant solid spoke arcs, and a plurality of lug bolts anchored in each of said spoke portions for securing each of said relatively wide rim clamping lugs in place to effectively retain the alignment and gripping of a tire rim thereon.

2. A heavy duty integrally cast rigid vehicle wheel for trailers and the like, as defined in claim 1, in which the solid spoke portions are greater in angular expanse than the spaces therebetween.

3. A heavy duty integrally cast rigid vehicle wheel for trailers and the like, as defined in claim 2, in which the central hub and the radially disposed spoke portions are reinforced with integral homogeneous annular segmental webs.

4. A heavy duty integrally cast rigid vehicle wheel for trailers and the like, as defined in claim 3, wherein the central hub is relatively large in diameter and said spoke portions have relatively short radii to insure maximum spoke strength.

5. A heavy duty integrally cast rigid vehicle wheel for trailers and the like, as defined in claim 4, wherein the clamping lugs have elongated slots proximate to each end thereof extending parallel to the mean radius of each spoke portion, and lug bolts are anchored proximate to the circumference of the spokes to project through said slots to secure said clamping lugs in place on said spoke portions.

References Cited in the file of this patent

UNITED STATES PATENTS

| D. 156,291 | Swain | Nov. 29, 1949 |
| 1,095,770 | Anglada | May 5, 1914 |
| 1,095,777 | Baker | May 5, 1914 |
| 1,873,600 | Kay | Aug. 23, 1932 |
| 2,564,158 | Forbes | Aug. 14, 1951 |

FOREIGN PATENTS

| 486,023 | France | of 1918 |
| 657,206 | Great Britain | Sept. 12, 1951 |